UNITED STATES PATENT OFFICE.

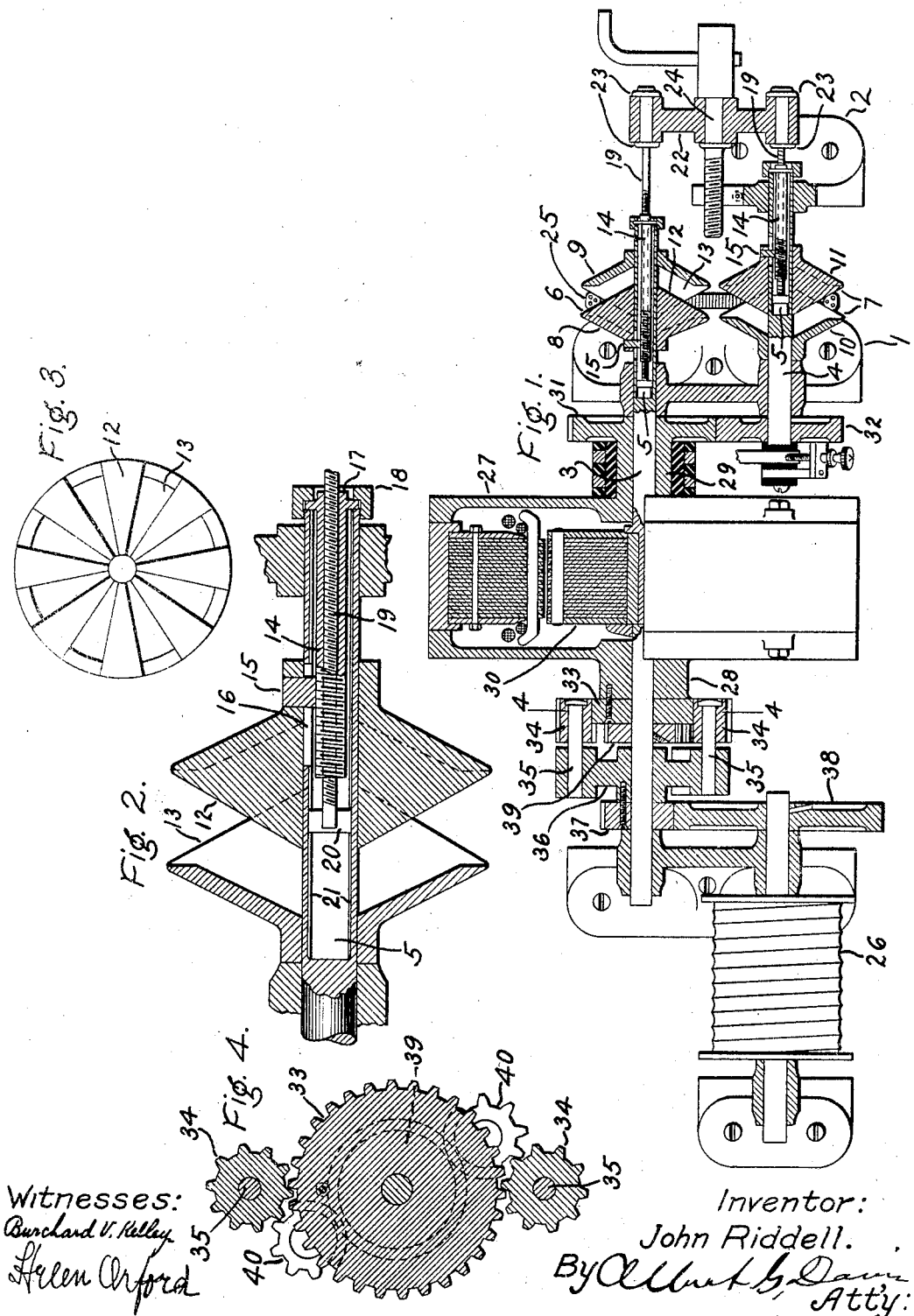

JOHN RIDDELL, OF SCHENECTADY, NEW YORK, ASSIGNOR TO GENERAL ELECTRIC COMPANY, A CORPORATION OF NEW YORK.

SPEED-CHANGING DEVICE.

No. 902,538.  Specification of Letters Patent.  Patented Oct. 27, 1908.

Original application filed July 9, 1904, Serial No. 215,882. Divided and this application filed July 6, 1905. Serial No. 268,325.

*To all whom it may concern:*

Be it known that I, JOHN RIDDELL, a citizen of the United States, residing at Schenectady, in the county of Schenectady and State of New York, have invented certain new and useful Improvements in Speed-Changing Devices, of which the following is a specification.

The present application is a division of my former application, Serial Number 215,882, filed July 9, 1904, for a speed-changing device, and the invention herein described and claimed relates to the arrangement of expansible pulleys and the means for varying their effective diameters applicable to such speed-changing device, and has for its object the provision of a compact and highly efficient means for effecting the changes of adjustment of the pulleys with facility.

In carrying out my invention, I mount upon hollow parallel-supported shafts two expansible pulleys, each consisting of similar halves having intermatching ribs and grooves, the left-hand half of one pulley and the right-hand half of the other being secured to its respective shaft while the other halves of said pulleys are adapted to be moved axially with respect thereto by devices extending into the hollow shafts and actuated by means external thereof. The pulleys are connected by an endless belt or band which engages and is held in alinement by the grooves formed by the opposing inclined faces of the intermatching ribs.

For a more complete understanding of the invention, reference may be made to the following detailed description and to the accompanying drawing forming a part of this specification in which, Figure 1 is a part plan and part horizontal section of a speed-changing device with an expansible pulley arrangement embodying my invention applied thereto; Fig. 2 is an enlarged section of one of the pulleys and its adjusting means; Fig. 3 is a front elevation of one-half of a pulley; and Fig. 4 is a cross-section taken on line 4—4 of Fig. 1, showing the arrangement of gears at the left-hand end of the speed-changing device.

In suitable bearing blocks 1, 2 are journaled two parallel shafts 3, 4 with axial bores 5 in their right-hand ends, and on these shafts are mounted expansible pulleys 6, 7 each consisting of two similar parts 8, 9, 10, 11 having intermatching ribs 12 and grooves 13. The right-hand part 9 of pulley 6 and the left-hand part 10 of pulley 7 are rigidly connected to their respective shafts 3 and 4 by driving joints or other suitable means, and the other members 8 and 11 are mounted thereon to slide freely toward and from the fixed members 9 and 10. The object of this inverse arrangement of the fixed and sliding members of the pulleys is to preserve the transverse alinement of the grooves formed by the opposing halves of the pulleys throughout the travel of the sliding members so that the belt or band connecting them will not tend to crowd to one side or pull out of the grooves.

The means for sliding each of the movable members 8 and 11 along its shaft consists of a threaded sleeve 14 located inside of the shaft and engaging a segmental nut 15 fixed in the movable member and extending through a longitudinal slot 16 in the shaft. The outer end of the threaded sleeve 14 is provided with a swivel head 17 free to turn between the outer end of the shaft and a flanged nut 18 threaded to the outside of the shaft. The means for rotating the threaded sleeve 14, independent of the shaft, consists of a screw rod 19 threaded to the inside of the sleeve and having a double or much sharper pitch than the thread on the outside of the sleeve so that by applying a force along the axis of the rod rotary movement will be produced in the sleeve. The inner end of the rod 19 carries a transverse block 20 so feathered in longitudinal grooves 21 cut in opposite sides of the bore 5 that the rod is caused to rotate with the shaft, but is left free to move axially. It will be noted that this construction provides within itself the means for self containing the end thrust of the pulley sections due to the wedging action of the belt thereon.

The screw rods 19 of both shafts 3 and 4 are connected for simultaneous movement in or out to a cross-head 22 having bearings at opposite ends in which the rods are journaled, the latter being provided with shoulders 23 which engage opposite sides of the cross-head. The head 22 is caused to move axially of the shafts by a lead screw 24 journaled therein at its center and engaging a stationary threaded part on the bearing block 2.

The pulleys 6 and 7 are connected by an endless belt 25, preferably of triangular shape.

My expansible pulley arrangement is shown in Fig. 1 applied to a hoisting device 26 driven by an induction motor having a drum 27 carrying the field magnet and provided with end sleeves 28, 29 journaled upon shaft 3, and an armature 30 splined to the shaft 3 within the drum. The sleeve 29 carries a spur gear 31 which meshes with a smaller spur gear 32 fixed to the shaft 4, and sleeve 28 carries a spur gear 33 which meshes with two long pinions 34 journaled on stub shafts 35 at opposite ends of a rotary head 36 journaled upon shaft 3 and rigidly connected to a small gear 37 which meshes with a larger gear 38 on the shaft of the hoisting device 26. The shaft 3 has fixed thereto between the gear 33 and the head 36 a gear 39 somewhat smaller than gear 33 which meshes with idler gears 40 carried by stub shafts on the head 36 and meshing with the long pinions 34.

Assuming that the gears 33 and 39 have the same ratio as gears 31 and 32 and the expansible pulleys to be in the positions shown in Fig. 1 with equal effective diameters then upon excitation of the motor, the drum 27 and armature 30 will rotate in opposite directions at such relative speeds as to produce equal and opposite peripheral speeds in the gears 33 and 39, and as a consequence the long pinions 34 will merely rotate on their axes without tending to produce planetary action therein and the hoisting drum remains at rest, but upon manipulation of the lead screw in one direction or the other the effective diameters of the expansible pulleys are made unequal and planetary motion in the pinions 34 takes place producing a driving action upon the hoisting drum to raise or lower according to whether the effective diameter of pulley 6 is made greater or less than the effective diameter of pulley 7 by the adjustment of the lead screw 24.

I do not desire to restrict myself to the particular construction or arrangement of parts herein described and shown, since it is apparent that they may be changed and modified without departing from my invention.

What I claim as new and desire to secure by Letters Patent of the United States, is,

1. The combination with a tubular shaft having a longitudinal slot, of a pulley composed of similar halves having intermatching radial ribs and grooves, one part being fixed to the shaft and the other loose thereon, a screw-threaded sleeve rotatably secured in said shaft, a segment-nut secured to the movable half of the pulley and passing through said slot into engagement with the sleeve, and means for rotating said sleeve.

2. The combination with a tubular shaft having a longitudinal slot, of a pulley composed of similar halves having intermatching radial ribs and grooves, one part being fixed to the shaft and the other loose thereon, a screw-threaded sleeve rotatably secured in said shaft, a segment-nut secured to the movable half of the pulley and passing through said slot into engagement with the sleeve, and means for rotating said sleeve consisting of a longitudinally movable rod having screw threads of long pitch meshing with similar threads in the inside of said sleeve.

3. The combination with a tubular shaft having a longitudinal slot, a longitudinally movable part mounted on said shaft, an externally screw threaded sleeve mounted within said shaft and free to rotate therein but held from longitudinal movement relatively thereto, means operatively connecting said movable part and the screw thread of said sleeve, and means for rotating said sleeve independently of said shaft.

In witness whereof, I have hereunto set my hand this 5th day of July, 1905.

JOHN RIDDELL.

Witnesses:
BENJAMIN B. HULL,
HELEN ORFORD.